United States Patent [19]

Farrow et al.

[11] Patent Number: 4,594,479

[45] Date of Patent: Jun. 10, 1986

[54] FAST START-UP OF ADAPTIVE ECHO CANCELER OR ECHO MEASUREMENT DEVICE

[75] Inventors: Cecil W. Farrow, Highlands; Jack Salz, Fair Haven, both of N.J.

[73] Assignee: AT&T Information Systems Inc. Bell Telephone Laboratories, Inc., Murray Hill, N.J.

[21] Appl. No.: 524,421

[22] Filed: Aug. 18, 1983

[51] Int. Cl.[4] .............................................. H04B 3/20
[52] U.S. Cl. .................................................. 179/170.2
[58] Field of Search ............... 179/170.2, 170.6, 170.8; 370/32

[56] References Cited

U.S. PATENT DOCUMENTS

| | | | |
|---|---|---|---|
| 3,588,385 | 6/1971 | Moye | 179/170.2 |
| 3,632,905 | 1/1972 | Thomas | 179/170.2 |
| 3,735,055 | 5/1973 | Thomas | 179/170.2 |
| 4,126,770 | 11/1978 | Tamura et al. | 179/170.2 |
| 4,162,378 | 7/1979 | Baudoux et al. | 179/170.2 |
| 4,321,686 | 3/1982 | Horns | 364/724 |

*Primary Examiner*—Gene Z. Rubinson
*Assistant Examiner*—R. Vaas
*Attorney, Agent, or Firm*—Barry H. Freedman

[57] ABSTRACT

A method and apparatus for rapid initialization of the transversal filter coefficients in an echo canceler or echo measurement device is described. During initialization, a first data sequence is applied to a transmission channel, and an error signal representing the difference between the resulting echo and a replica thereof generated by the transversal filter is formed. The coefficients used to form the replica (in the case of an echo canceler) or to model the transmission channel (in the case of an echo measurement device) are then updated as a function of the error and a second data sequence which is orthogonal to the first sequence.

18 Claims, 9 Drawing Figures

FAST START-UP OF ADAPTIVE ECHO CANCELER OR ECHO MEASUREMENT DEVICE

BACKGROUND OF THE INVENTION

The present invention relates generally to a technique and apparatus for measurement of echoes and generation of a replica of an echo channel and to cancellation of echoes in a full duplex digital data transmission system and, in particular, to a technique and apparatus for start-up of an echo canceler or an echo measurement device implemented using at least one transversal filter whose tap weights are adaptively updated using a least mean squares algorithm.

DESCRIPTION OF THE PRIOR ART (a) Echo Cancellation or Measurement, Generally

When it is desired to transmit digital data signals simultaneously in two directions over a limited bandwidth communication channel and when both directions of transmission use the same or overlapping frequency bands, imperfections in the transmission medium, the hybrid or other parts of the channel cause echoes from the transmitted signal to be confused with the signal received from the remote transmitter. These echoes can be eliminated with an echo canceler which uses the signal received from the channel and knowledge of the local transmitted signal to derive a replica of the echo which is then subtracted from the received signal. The cancellation signal can be synthesized by forming the sum of the products of a plurality of stored canceler coefficients and individual elements of the transmitted signal. A transversal filter which includes a multibit delay line, means for multiplying the signals at various delay line taps by respective weighting coefficients, and means for summing the resulting products, can be used for this purpose. The coefficients, when converged, themselves form a replica of the echo channel. The residual error obtained by forming the difference between the cancellation and received signals is used together with the transmitted signal to recursively update the coefficients using a stochastic gradient algorithm which minimizes the mean square error.

Echo measurement is performed in a similar manner, but is used not to cancel the echoes but to form a replica of the echo channel, in applications such as radar, seismology, etc.

(b) Start-Up or Initialization

In order to start up an echo canceler or echo measuring device so as to install appropriate initial values for the coefficients used during measurement or cancellation, it is necessary to, in effect, measure the impulse response of the echo channel, i.e., from the local transmitter output to the local receiver input. While this can theoretically be done by transmitting a *single* pulse and measuring its response, the average power of the received signal would be small, yielding a signal to noise ratio (SNR) which is below that which can be useful. Alternatively, a pseudo-random sequence (i.e., random-like but repeatable) of positive and negative pulses could be transmitted, increasing the average power and more nearly modeling the start-up sequence in accordance with the elements of a true data signal.

Typical, easy to generate pseudo-random start-up sequences $\{a_i\}$ have period $N = 2^M - 1$ (where M is a positive integer) and include elements $a_i = \pm 1$ ($0 \leq i \leq N-1$) such that $$\sum_{i=0}^{N-1} a_i = 1. \quad (1)$$

The elements in sequence $\{a_i\}$ can be thought of as forming a vector $a_i, a_{i+1} \ldots a_{N-1}, a_0 \ldots a_{i-1}$, where i is an index between 0 and $N-1$. Typically, the sequence $\{a_i\}$ was generated as a function of a maximum-length sequence of 1's and 0's by mapping each 1 to a value of $+1$ and each 0 to a value of $-1$ in a symbol generator. This sequence also satisfied the relationships:

$$A_i \cdot A_j = N \text{ if } i = j$$

and $$A_i \cdot A_j = -1 \text{ if } i \neq j, \quad (2)$$

where j is also an index between 0 and $N-1$. The dot product between the vectors $A_i$ and $A_j$ in equation (2) is defined as:

$$A_i \cdot A_j = a_i \cdot a_j + a_{i+1} \cdot a_{j+1} + a_{i+2} \cdot a_{j+2} + \ldots + a_{i-1} \cdot a_{j-1}.$$

In the known start-up technique, the same data sequence $\{a_i\}$ applied to the transmission channel is also used to update the coefficients within the echo canceler or echo measurement device, using a recursive algorithm that tends to minimize the least mean square error. In particular, the new vector $C_{n+1}$ of tap coefficients which represents a replica of the echo channel, is obtained by adding a correction term to the existing value of the vector $C_n$ such that:

$$C_{n+1} = C_n + \alpha e_n A_n \quad (3)$$

where $e_n$ is the residual error obtained by forming the difference between the canceler output and the signal returned from the transmission channel.

Sequences with the properties represented by equations (1) and (2) were chosen in an attempt to simulate a true random sequence. However, it was found that a large number of cycles were needed for the canceler error to decay to a small value. This relatively long start-up interval was costly in that transmission of real data is not possible during the start-up period.

In view of the foregoing, it is the broad object of the present invention to enable fast start-up of an echo canceler or echo measurement device which includes at least one transversal filter and adaptively updated coefficients.

SUMMARY OF THE INVENTION

In accordance with the present invention, start-up in a baseband echo canceler is achieved by transmitting a first sequence of values $\{a_i\}$ arranged in accordance with equations (1) and (2) above, and generating a replica or cancellation signal by forming the sum of the products of a plurality of stored canceler coefficients and elements of the first sequence. The canceler coefficients are formed and recursively updated as the product of (1) the error or difference between the replica and a received signal resulting from application of the first sequence to a transmission medium, (2) the elements of a second sequence $\{a'_i\}$ which form a vector $a'_i, a'_{i+a} \ldots a'_{N-1}, a'_0 \ldots a'_{i-1}$ and (3) a scaling factor $\alpha = 1/(N+1)$ which is related to the length N of the first and second sequences. The first and second sequences are arranged to be "inverse" or "orthogonal" sequences of length N such that the corresponding vectors $A'_i$ and $A_j$ satisfy the relationship:

$$A'_i \cdot A_j = N+1 \text{ if } i=j$$

and $$A'_i \cdot A_j = 0 \text{ if } i \neq j. \quad (4)$$

The sequences $\{a_i\}$ and $\{a'_i\}$ can advantageously be formed using the fact that each term $a'_i$ in the sequence is given by $$a'_i = a_i + 1, \quad (5)$$

when the elements $a_i$ assume values $\pm 1$. The invention can be practiced in a synchronous canceler or individually in subcancelers within a Nyquist canceler. The invention can also be practiced in an echo measurement device where the coefficients represent a replica of the echo channel.

BRIEF DESCRIPTION OF THE DRAWING

The features and advantages of the instant invention will be better appreciated by reading the following detailed description in light of the accompanying drawing in which.

DETAILED DESCRIPTION

Figure 1:
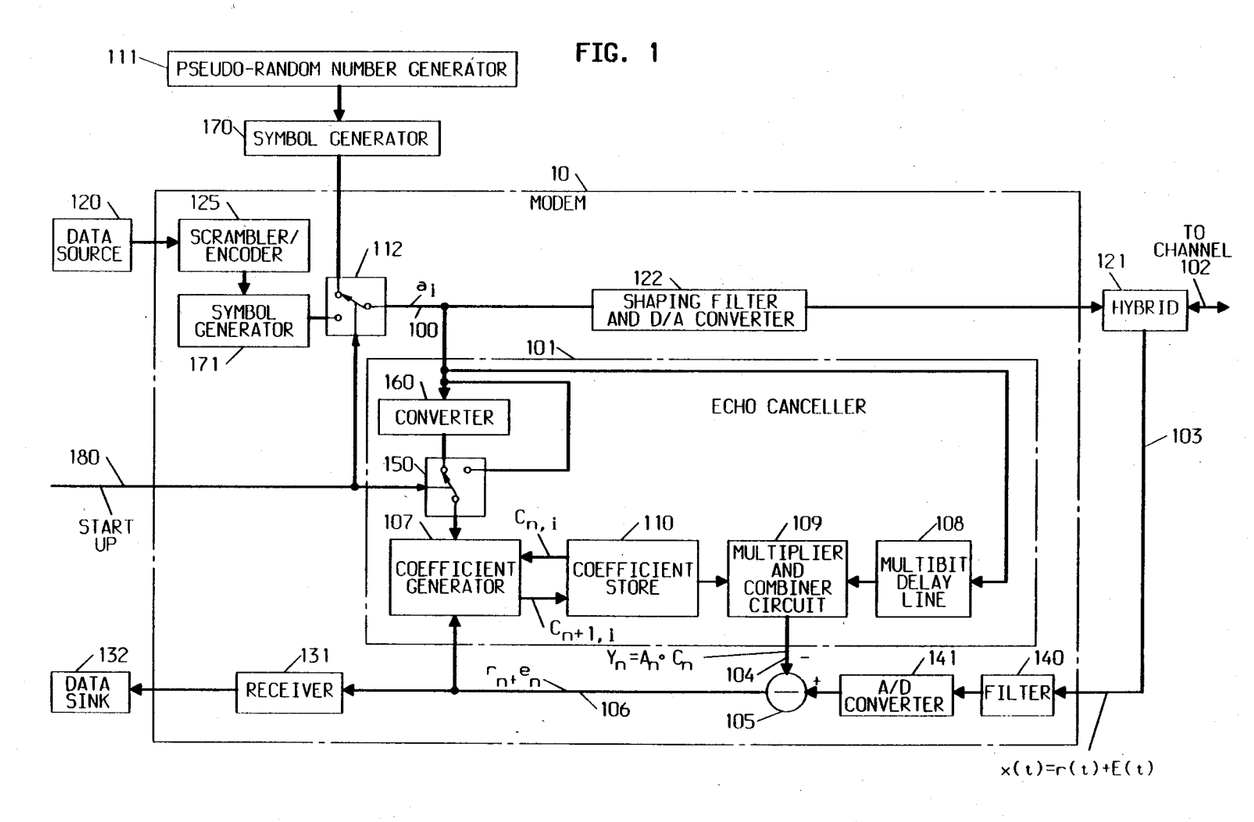
FIG. 1 is a block diagram of a synchronous baseband modem which includes an echo canceler arranged for start-up in accordance with the present invention.

The objectives of the present invention will be understood from an examination of FIG. 1, which illustrates a modem 10 which includes a synchronous baseband echo canceler 101 arranged to operate in a start-up mode in accordance with the principles of the present invention. During normal operation in a "run" mode with actual data from a source 120, a baseband data signal consisting of a sequence $\{a_1\}$ of elements of value $\pm 1$ is applied by modem 10 to channel 102 via hybrid 121. The outbound leg of modem 10 typically includes a conventional scrambler/encoder 125, a symbol generator 171 and a digital shaping filter followed by digital-to-analog conversion in circuit 122. Elements of the input signal are also applied to canceler 101 via an input on line 100.

The signal received at hybrid 121 from channel 102 at time t is designated x(t). When a remote data transmitter is in operation, x(t) includes a signal r(t) originating at the distant location and an uncancelled echo E(t). Another term which is not shown is Gaussian noise introduced by the telephone channel. Experiments have shown that this noise does not affect the present invention, and therefore, for simplicity, we will not include it in the following discussion. This combined signal on line 103 is applied to the in-bound leg of modem 10, including filter 140 and A/D converter 141. If A/D converter 141 samples at a rate $1/\tau$, its output at time $n\tau$ will be $r(n\tau) + E(n\tau)$. We will first assume that the sampling rate at which A/D converter 141 operates is the same as the rate at which new elements are generated on line 100. In this case, the echo canceler will generate new outputs at the same rate at which it receives new inputs—such a canceler will be called a synchronous canceler.

The output of converter 141 is applied to one input of subtractor 105, which receives its second input $y(n\tau)$ from the output of canceler 101 on line 104. The difference formed in subtractor 105, which includes both $r(n\tau)$ and a residual error $e(n\tau)$, is applied via line 106 to a coefficient generator 107 within canceler 101. The output of subtractor 105 is also applied to a conventional receiver 131 which recovers the received information $r(n\tau)$ and couples it to a data sink 132. In the following description, quantities like $r(n\tau)$ will simply be written $r_n$.

Within canceler 101, coefficient generator 107 recursively updates the N multiplier coefficients $c_{n,i}$ ($0 \leq i \leq N-1$) contained in a coefficient store 110 as a function of both the residual error signal $e_n$ and elements of the input sequence $a_i$ stored in an internal register, forming N new coefficients $c_{n+1,i}$ ($0 \leq i \leq N-1$) which replace the old values in store 110. Before updating, the coefficients in store 110 are multiplied in multiplier/combiner circuit 109 by respective ones of the N previous elements of the input sequence stored in a multibit delay line 108, to form products which are combined to yield the canceler output $y_n = A_n \cdot C_n$ on line 104.

In the ideal case, the coefficient values in canceler 101 converge so that its characteristics exactly match those of the echo channel which includes the path from line 100 through the shaping filter, the hybrid, filter 140, plus additional return paths occurring in channel 102. When this occurs, the canceler output $y_n$ on line 104 exactly equals the sampled version of the uncompensated error E(t) on line 103, and the residual error $e_n$ is zero.

Figure 2:
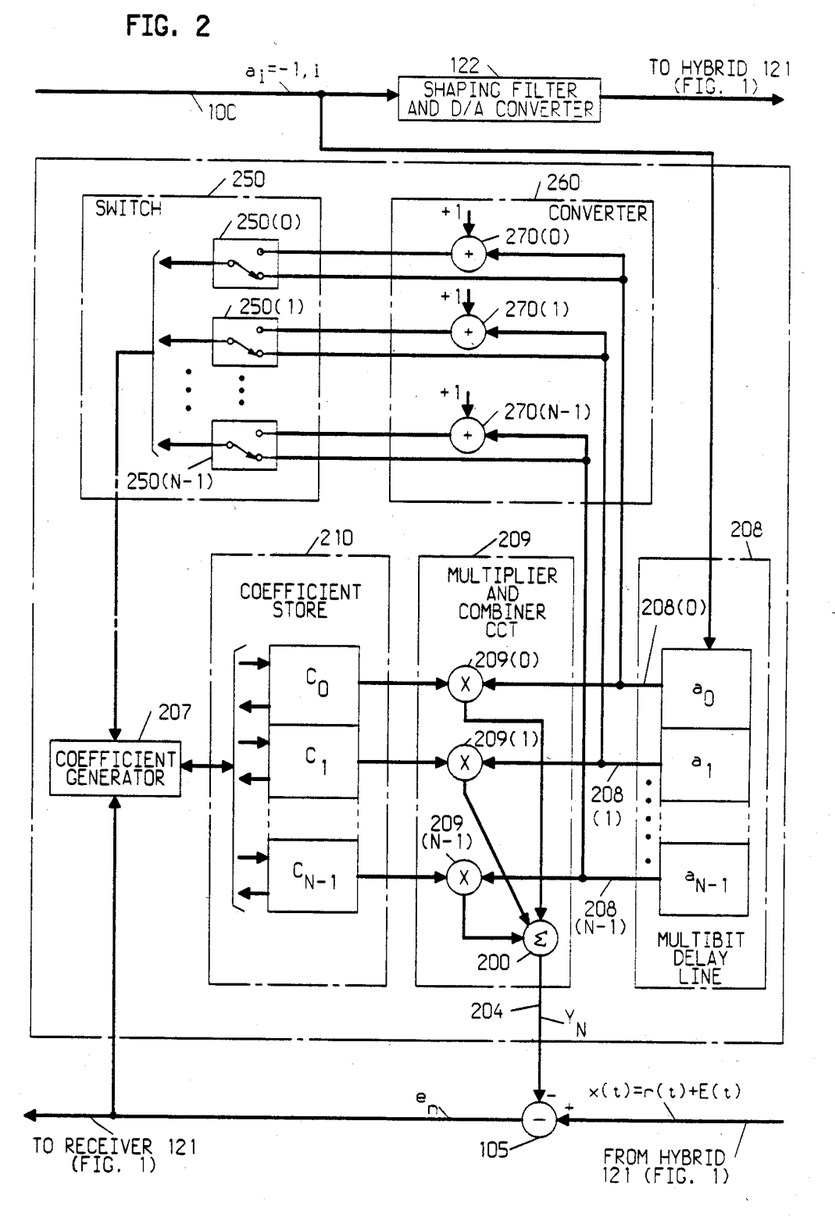
FIG. 2 is a block diagram of another embodiment of the echo canceler shown in FIG. 1.

Before proceeding with a description of the start-up technique used in conjunction with the arrangement of FIG. 1, it is instructive to consider a specific embodiment of canceler 101 as shown in FIG. 2. In this embodiment, multibit delay line 208 receives a serial input representing data elements $a_i$ on line 100 and makes N elements $a_0$ through $a_{N-1}$ simultaneously available at taps 208(0) to 208 (n−1), respectively. At time $n\tau$ these elements are used both to form the output $y_n$ of the canceler and to form updates for coefficients contained in store 210. Delay line 208 supplies first inputs to a corresponding set of N multipliers 209(0) to 209(N−1) while N coefficient values $c_{n,0}$ to $C_{n,N-1}$, from coefficient store 210 are applied to respective second inputs of the multipliers. The products formed in the multipliers are combined in a summer 200 to yield the canceler output $y_n$ on line 204. The coefficients $c_{n,i}$ in store 210 are updated in coefficient generator 207 as a joint function of the values of (1) the previous coefficient $c_{n,i}$, (2) the input data elements $a_i$, (3) the uncompensated error $e_n$ (formed in subtractor 105) which is the difference between the received signal $x_n$, and the output $y_n$ of the canceler and (4) a scaling factor $\alpha$. For example, the new value $c_{n+1,N-1}$ of the $N-1^{th}$ coefficient in store 210 is given by:

$$c_{n+1,N-1} = c_{n,N-1} + \alpha e_n a_{N-1} \quad (6)$$

where $c_{n,N-1}$ is the previous value of the $N-1^{th}$ coefficient, $a_{N-1}$ is the value of the $N-1^{th}$ input data element in delay line 208, $e_n$ is the value of the residual error during the current sampling interval, and $\alpha$ is typically a small fraction.

In order to initialize the coefficients stored in the cancelers of FIG. 1 or 2, prior art start-up techniques typically included a start-up mode in which the actual data from source 120 is replaced by a pseudo-random sequence of values generated using a pseudo-random number generator 111 shown in FIG. 1. The output of generator 111, typically a series of 1's and 0's, is applied to a symbol generator 170, each 1 to a $+1$ value and each 0 to a $-1$ value. The output of symbol generator 170 is connected to input line 100 by repositioning switch 112 in response to a control signal applied on line 180. To avoid the necessity of a large number of iterations to converge the canceler output, a conventional start-up sequence obtained from generator 111 included a maximum length sequence which produced at the output of symbol generator 170 a corresponding sequence $\{a_i\}$ of period $N=2^M-1$, where M is an integer, and the individual elements of the sequence have $\pm 1$ values. Traditionally, these start-up sequences are arranged such that $$\sum_{i=0}^{N-1} a_i = 1. \quad (1)$$

The elements in sequence $\{a_i\}$ are also arranged in a particular order so that they form vectors $A_i = [a_i, a_{i+1} \ldots a_{N-1}, a_0, a_1 \ldots a_{i-1}]$ and $A_j = [a_j, a_{j+1} \ldots a_{N-1}, a_0, a_1 \ldots a_{j-1}]$ (where i and j are indices between 0 and $N-1$) which have the property that $$A_i \cdot A_j = N \text{ if } i=j$$

$$A_i \cdot A_j = -1 \text{ if } i \neq j. \quad (2)$$

Examples of sequences which satisfy equations (1) and (2) are listed below for values of M of 4, 5, 6, 7 and 8. For each value of M, a second sequence may be formed by simply reading the listed sequence in the reverse order. Other sequences of each length which satisfy equations (1) and (2) may also be possible.

M = 4 (N = 15):

1 1 1 1 −1 −1 −1 1 −1 −1 1 1 −1 1 −1    (7)

M = 5 (N = 31):

1 1 1 1 1 −1 −1 1 1 −1 1 −1 −1 1 −1 −1 −1 1 1 −1 1 1 −1 −1 −1    (8)

M = 6 (N = 63):

1 1 1 1 1 1 −1 −1 −1 −1 −1 1 −1 −1 −1 −1 1 1 −1    (9)
−1 −1 1 −1 1 −1 −1 1 1 1 1 −1 1 −1 −1 −1 1 1 −1
−1 −1 1 −1 −1 1 −1 1 1 −1 1 1 1 −1 1 1 −1 −1 1
1 −1 1 −1 1 −1

M = 7 (N = 127):    (10)

M = 8 (N = 255):    (11)

That sequence (7) listed above (for M=4) satisfies the requirements of equation (1) can be demonstrated by simply summing its elements: 8 elements have a value of $+1$ and 7 elements have a value of $-1$, so that the element sum is $+1$, as desired. Satisfaction of equation (2) is demonstrated by considering the relationships between vectors $A_0$ to $A_{14}$ formed from the elements of sequence $\{a_i\}$, as follows:

$$A_0 = [\ 1\ \ 1\ \ 1\ \ 1\ -1\ -1\ -1\ \ 1\ -1\ -1\ \ 1\ \ 1\ -1\ \ 1\ -1\ ]$$
$$A_1 = [\ 1\ \ 1\ \ 1\ -1\ -1\ -1\ \ 1\ -1\ -1\ \ 1\ \ 1\ -1\ \ 1\ -1\ \ 1\ ]$$
$$A_2 = [\ 1\ \ 1\ -1\ -1\ -1\ \ 1\ -1\ -1\ \ 1\ \ 1\ -1\ \ 1\ -1\ \ 1\ \ 1\ ]$$
$$A_3 = [\ 1\ -1\ -1\ -1\ \ 1\ -1\ -1\ \ 1\ \ 1\ -1\ \ 1\ -1\ \ 1\ \ 1\ \ 1\ ]$$
$$A_4 = [-1\ -1\ -1\ \ 1\ -1\ -1\ \ 1\ \ 1\ -1\ \ 1\ -1\ \ 1\ \ 1\ \ 1\ \ 1\ ]$$

(12)

-continued

| | | | | | | | | | | | | | | | |
|---|---|---|---|---|---|---|---|---|---|---|---|---|---|---|---|
| $A_5 =$ [ | −1 | −1 | 1 | −1 | −1 | 1 | 1 | −1 | 1 | −1 | 1 | 1 | 1 | 1 | −1] |
| $A_6 =$ [ | −1 | 1 | −1 | −1 | 1 | 1 | −1 | 1 | −1 | −1 | 1 | 1 | 1 | −1 | −1] |
| $A_7 =$ [ | 1 | −1 | −1 | 1 | 1 | −1 | 1 | −1 | 1 | 1 | 1 | −1 | −1 | −1 | −1] |
| $A_8 =$ [ | −1 | −1 | 1 | 1 | −1 | 1 | −1 | 1 | 1 | 1 | −1 | −1 | −1 | −1 | 1] |
| $A_9 =$ [ | −1 | 1 | 1 | −1 | 1 | −1 | 1 | 1 | 1 | −1 | −1 | −1 | −1 | 1 | 1] |
| $A_{10} =$ [ | 1 | 1 | −1 | 1 | −1 | 1 | 1 | 1 | −1 | −1 | −1 | −1 | 1 | 1 | −1] |
| $A_{11} =$ [ | 1 | −1 | 1 | −1 | 1 | 1 | 1 | −1 | −1 | −1 | −1 | 1 | 1 | −1 | 1] |
| $A_{12} =$ [ | −1 | 1 | −1 | 1 | 1 | 1 | −1 | −1 | −1 | −1 | 1 | 1 | −1 | 1 | 1] |
| $A_{13} =$ [ | 1 | −1 | 1 | 1 | 1 | −1 | −1 | −1 | −1 | 1 | 1 | −1 | 1 | 1 | −1] |
| $A_{14} =$ [ | −1 | 1 | 1 | 1 | −1 | −1 | −1 | −1 | 1 | 1 | −1 | 1 | 1 | −1 | 1] |

By observation, it will be seen that $$A_0 \cdot A_0 = A_1 \cdot A_1 = A_2 \cdot A_2 = \ldots = A_{14} \cdot A_{14} = 15.$$

To see that the dot product of any two vectors is $-1$ when $i \neq j$, consider $A_4 \cdot A_7$ as an example. This product is given by:

$$
\begin{aligned}
&[-1 \cdot 1] + [-1 \cdot -1] + [-1 \cdot -1] + [1 \cdot 1] + [-1 \cdot 1] + \\
&[-1 \cdot -1] + [1 \cdot 1] + [1 \cdot -1] + [-1 \cdot 1] + [1 \cdot 1] + \\
&[-1 \cdot 1] + [1 \cdot 1] + [1 \cdot -1] + [1 \cdot -1] + [1 \cdot -1] + \\
&[-1] + [1] + [1] + [1] + [-1] + [1] + [1] + [-1] + [-1] \\
&[1] + [-1] + [1] + [-1] + [-1] + [-1] = \\
&-1.
\end{aligned}
\tag{13}
$$

Similarly, the dot products of other vectors (with $i \neq j$) is also $-1$, thus satisfying equation (2).

Figure 3:
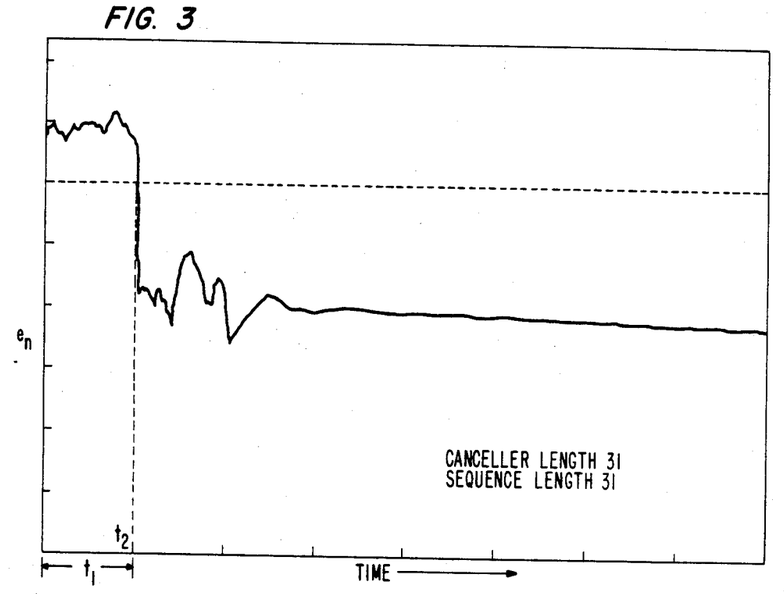
FIGS. 3–5 are graphs showing the error signal produced when an echo canceler is started up using prior art techniques.
Figure 4:
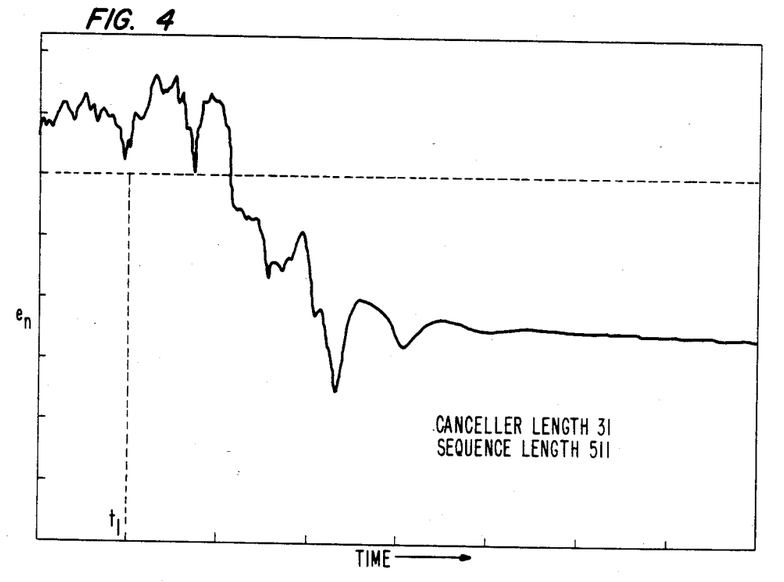
Figure 5:
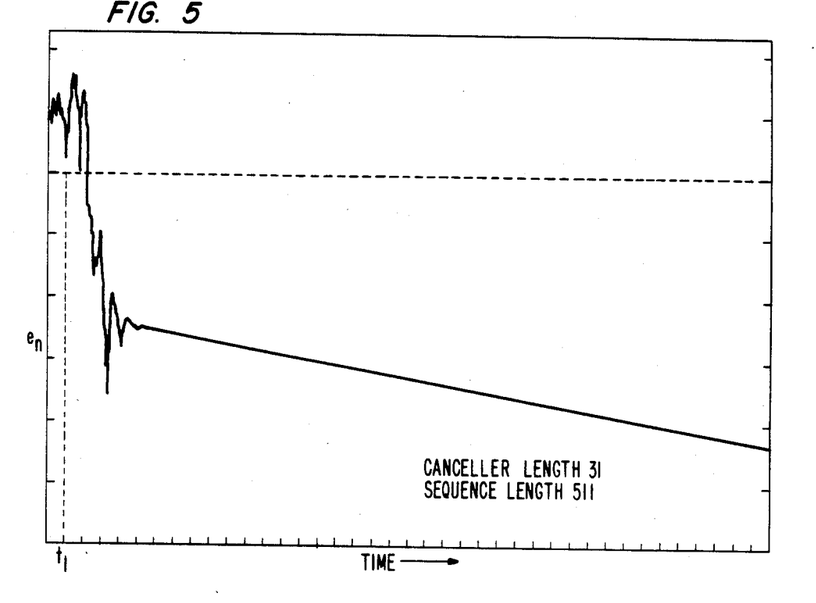

When the prior art start-up technique was practiced by applying the sequence $\{a_i\}$ just described to a canceler of the type shown in FIG. 1 or 2, a relatively long start-up interval ensued, as illustrated in FIGS. 3–5. In FIG. 3, the residual error signal $e_n$ output from subtractor 105 is shown as a function of time, when a start-up sequence of length $N=31$ is applied to a canceler that includes a 31-bit delay line 108 or 208. During an initial interval $t_1$, the canceler has not yet begun to converge, and the error is relatively high. After the initial N elements in the pseudo-random input sequence have been processed, a significant drop in the error signal occurs at time $t_2$. Thereafter, however, as succeeding elements are applied, the rate at which the error further decreases is slowed; after an additional series of N input data elements have been processed, the error remains essentially unchanged compared to its value at $t_2$.

A similar situation is shown in FIGS. 4 and 5, which illustrate the error signal produced when a start-up sequence of length $N=511$ is applied to a canceler with a 31-bit delay line; the time scale in FIG. 4 is expanded with respect to the scale in FIG. 5, but FIGS. 4 and 5 are otherwise the same. As can be seen, after an initial interval $t_1$ during which the first N elements are processed, the error is still relatively high. Even after an interval $2t_1$, the error remains high, but a rather abrupt decrease in the magnitude of the error then occurs. Thereafter, the further decrease over time is small.

In accordance with the present invention, echo canceler coefficients are more quickly initialized in the start-up mode by modifying the data sequence output from pseudo-random number generator 111 before application to coefficient generator 107 or 207. As shown in FIG. 1, this is accomplished by simultaneously repositioning switch 150 when switch 112 is positioned to connect the output of pseudo-random number generator to line 100 in the start-up mode. With this arrangement, a maximum length sequence $\{a_i\}$ is generated by pseudo-random number generator 111 and applied directly to multibit delay line 108 but a second sequence $\{a'_i\}$ generated in converter 160 is applied to coefficient generator 107. In the run mode, the same data from source 120 is applied both to coefficient generator 107 and multibit delay line 108.

Converter 160, one arrangement of which is shown in more detail in FIG. 2, is arranged to modify sequence $\{a_i\}$ so that the first and second sequences are "orthogonal". More particularly, in the context that follows, $A'_i$ and $A_j$ are vectors formed from N consecutive values in sequences $\{a'_i\}$ and $\{a_i\}$, respectively. Sequences $\{a'_i\}$ and $\{a_i\}$ are considered to be orthogonal sequences if the corresponding vectors are related such that:

$$A'_i \cdot A_j = N+1 \text{ if } i=j$$

and $$A'_i \cdot A_j = 0 \text{ if } i \neq j. \tag{4}$$

If the sequence $\{a_i\}$ has the properties that are described in equations (1) and (2) above, then each element in the sequence $\{a'_i\}$ can be generated simply by adding "1" to the corresponding element in the sequence $a_i$. Thus, if the $\{a_i\}$ sequence is made up of $+1$ and $-1$ elements, then the $\{a'_i\}$ sequence is made up of 2 and 0 elements, respectively.

Referring to FIG. 2, converter 260 may be arranged to include a series of N adders 270(0) to 270(N−1) and a corresponding series of N switches 250(0) to 250(N−1). When the switches are repositioned from the run position shown in FIG. 2 to the start-up position, the values applied to coefficient generator 207 are obtained from the adder outputs rather than directly from multi-bit delay line 208. Each adder is arranged to receive at a first input a respective one of the element values $a_0$ through $a_{N-1}$ stored in delay line 208. Each adder receives a fixed second input having an algebraic value of $+1$, so that the output of adders 270(0) through 270(N−1) and of switches 250(0) through 250(n−1) represent the desired second sequence $\{a'_i\}$ wherein $\{a'_i\}=\{a_i+1\}$. If the sequence $\{a_1\}$ satisfies the relationships expressed in equations 1 and 2 above, then the sequences $\{a_i\}$ and $\{a'_i\}$ are orthogonal sequences, as desired. During start-up, the scaling constant $\alpha$ is advantageously selected to be $1/(N+1)$.

Figure 6:
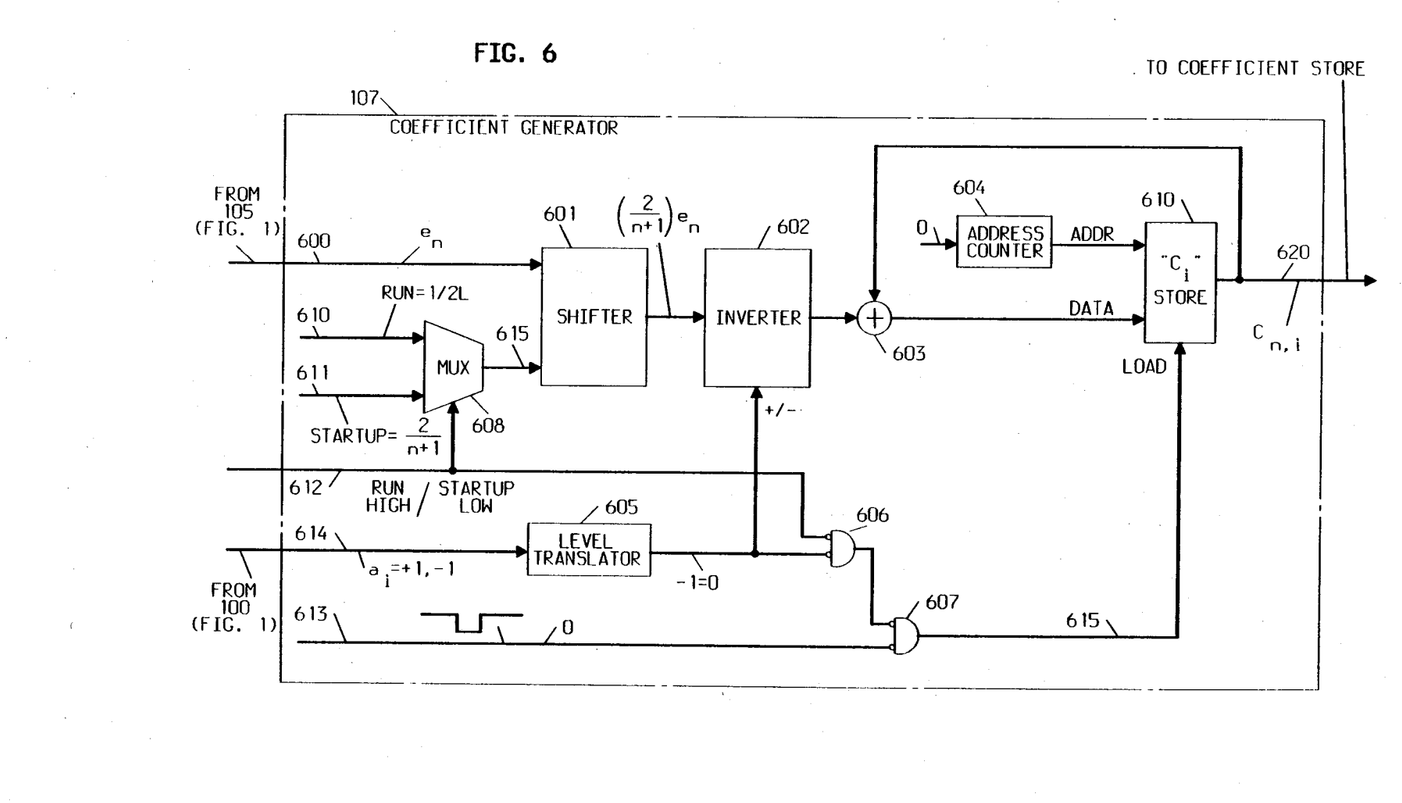
FIG. 6 is a block diagram of a specific embodiment of the coefficient update logic which implements the start-up technique of the present invention.

Another embodiment of coefficient generators 107 and 207 arranged in accordance with the principles of the instant invention is illustrated in FIG. 6. In this embodiment, the input data sequence $\{a_i\}$ from line 100

(FIGS. 1 and 2) is sequentially applied to a level translator 605 which translates each −1 input to a logic level 0 while not affecting a positive (+1) input. This translation is provided so that conventional NOR gates can control the load operation of coefficient store 610, as described below. The same translation can also be accomplished by simply removing symbol generator 170 from the apparatus shown in FIG. 1.

In the embodiment of FIG. 6, the coefficient update process expressed in Equation (3) above is performed sequentially on existing (old) coefficients stored in coefficient store 110 or 210. An address counter 604 is advanced by a clock $\phi$ so that the old coefficients $c_0$ through $c_{N-1}$ are applied, one at a time, to a first input of adder circuit 603. During each clock interval, the appropriate update term provided from the output of inverter 602 is added to the existing value to generate the corresponding updated (new) coefficient value, which replaces the old value in store 610. Counter 604 is then advanced to process the next coefficient value in the sequence. N clock intervals occur for each input data element in sequence $\{a_i\}$ (during start-up) or for each data element in an input data sequence from a data source.

Multiplications needed to form the update term added to each existing coefficient to obtain its new value are performed by shifter 601, which receives the residual error $e_n$ from subtractor 105 of FIG. 1 or 2 on line 600. As will be seen below, in both the run and start-up modes of operation, the update term is formed by multiplying $e_n$ by a quantity that may be expressed as a power of ½. Accordingly, multiplication may be accomplished by an appropriate shift of $e_n$ expressed as a binary number.

The operating mode of the coefficient generator, namely run mode or start-up mode, is determined by a signal applied on line 612. In the run mode, a high control signal is applied to multiplexer 608, coupling an input received on line 610 to shifter 601 via line 615. This input, designated $\alpha_{run}$, is typically a constant value $\frac{1}{2}^L$ (where L is an integer) small enough to compensate for a double talking condition. Shifter 601 is arranged to shift the binary value of $e_n$ left by L bits, in response to input $\alpha_{run}$, in effect providing the product of $e_n$ and $\frac{1}{2}^L$ at its output. Since equation (3) requires that the product $\alpha e_n a_i$ be added to the existing value $c_{n,i}$ of the coefficient being processed to obtain the new value $c_{n+1,i}$, the output of shifter 601 is applied to an inverter 602 which changes the sign of the product $\frac{1}{2}^L e_n$ in accordance with the sign of $a_i$: for positive $a_i$, the output of inverter 602 is positive, but for negative $a_i$, inverter 602 inverts the output of shifter 601.

The output of inverter 602 is combined in adder 603 with the existing value of the coefficient being processed to yield the new coefficient value, which is loaded in store 610, replacing the existing value, at the occurrence of a high load signal on line 615. This load signal is derived from NOR gates 606 and 607. In particular, when in the run mode, the mode control signal on line 612 remains high, and the output of gate 606 remains low, enabling gate 607 to pass a low clock pulse $\phi$ applied on line 613 each time address counter 604 is advanced. As will be seen below, certain load pulses are blocked from application to the load input of stores 610 in the start-up mode.

The embodiment of FIG. 6 utilizes the property that, in the start up mode, the sequence $\{a'_i\}$ used for coefficient updating consists of a series of 0's and 2's. Since the quantity subtracted from $c_{n,i}$ to obtain $c_{n+1,i}$ is given by the product $\alpha e_n a'_i$, where $\alpha=1/(N+1)$, a nonzero update occurs only when $a'_i$ is 2, i.e., when $a_i$ is +1; conversely, when $a_i$ is −1 (and $a'_i$ is thus 0) no updating of the existing coefficient occurs.

To initiate the start-up mode, the control signal applied on line 612 is brought low, causing multiplexer 608 to supply the value of $\alpha_{start-up}$ received on line 611 to shifter 601 via line 615. Since, in accordance with the present invention, the value of $\alpha$ (in equation (3)) during start-up is $1/(N+1)$ and updating occurs only when $a'_i$ is 2, multiplication by $1/(N+1)$ and conversion from the sequence $\{a_i\}$ to sequence $\{a'_i\}$ are accomplished simultaneously, by selecting the value of $\alpha_{start-up}$ on line 611 as $2/(N+1)$.

Since $N+1=2^M$, where M is an integer, this value of $\alpha_{start-up}$, when extended to shifter 601 on line 615, shifts the value of $e_n$ by $M-1$ places to the left. This is equivalent to multiplication of $e_n$ by $2/(N+1)$.

As in the run mode, the output of shifter 601 is inverted in inverter 602 in accordance with the value of the output received from level translator 605; a high (+1) output makes the output of inverter 602 positive, while a low output, which produces the opposite result, does not affect the coefficient update, as seen below. In the start-up mode, however, coefficient store 610 is only loaded with an updated value when a high level output from level translator 605 indicates that the value of $a_i$ is 1 and the value of $a'_i$ is thus 2. On the other hand, a low (0) output from level translator 605 (corresponding to a −1 value of $a_i$ and a 0 value of $a'_i$, indicating that the updating product term is zero) is coupled to NOR gate 606, the second input of which (from line 612) is also low. Accordingly, the output of gate 606 is high, maintaining the output of NOR gate 607 in a low state and inhibiting loading of coefficient stores 110 or 210 under this condition.

The convergence of the output of canceler 101 of FIGS. 1 and 2 after N iterations using the sequence $\{a_i\}$ in multibit delay lines 108 or 208 while using the orthogonal sequence $\{a'_i\}$ in coefficient generator 107 or 207 can be demonstrated by defining C as a vector including elements $c_0, c_1, c_2 \ldots c_{(N-1)}$, and by recalling the definitions of $A_i$ ($0 \leq i \leq N-1$) as a vector including elements $a_i, a_{i+1} \ldots a_{N-1}, a_0, a_1, \ldots a_{i-1}$, and vector $A'_i$ as a vector including similar elements of the sequence $\{a'_i\}$. Initially, at time $t=0$, when the first element (called $a_0$) in input sequence $\{a_i\}$ is applied to line 100 and to the transmission channel via hybrid 121, vector C has a zero value, so that the output $y_0$ of the canceler, which is the product of vectors $A_0$ and C, is also zero. At this time, the sampled version of the channel response x(t) on line 103 is denoted by $x_0$, so that the residual error $e_0$ applied to coefficient generator 107 or 207 is also $x_0$. During the first coefficient update cycle, the coefficient vector is updated according to:

$$C_1 = C_0 + \alpha e_0 A'_0, \qquad (14)$$

and we assume $C_0=0$. Accordingly, the new value of $C_1$ is $\alpha x_0 A'_0$.

At time $t=1$, the output of the canceler is given by $y_1 = \alpha x_0 A_1 \cdot A'_0$, which evaluates to zero because of equation (4) which specifies the relationship between sequences $\{a_i\}$ and $\{a'_i\}$ and thus vectors A and A'. The value received from the channel and the value of $e_1$ are now both $x_1$. The coefficients in store 110 or 210 are again updated, such that $C_2 = \alpha(x_0 A'_0 + x_1 A'_1)$.

At time $t=2$, the output of the canceler is given by $y_2 = \alpha(x_0 A_2 A'_0 + x_1 A_2 \cdot A'_1)$, which is again zero by virtue of Equation (4).

After N iterations, C is given by $$C_{N-1} = \alpha \sum_{i=0}^{N-1} x_i A'_i. \quad (15)$$

When the next input data element is applied, the input sequence is just beginning its second repetition, the received signal on line 103 is $x_0$, and the elements in multibit delay line 108 or 208 form vector $A_0$. The canceler output is now given by:

$$y_{N-1} = \alpha[x_0 A_0 \cdot A'_0 + x_1 A_0 \cdot A'_1 + x_2 A_0 \cdot A'_2 \ldots$$
$$x_{n-1} A_0 \cdot A'_{N-1}]. \quad (16)$$

By virtue of equation (4), all of the products on the right side of equation (9) are zero except the first term, which has a value:

$$x_0 A_0 \cdot A'_0 = (N+1) x_0. \quad (17)$$

Accordingly, since $\alpha = 1/(N+1)$, the output $y_{N-1}$ of the canceler is $x_0$ and the error after one complete start-up sequence has been processed is zero, as desired.

Figure 7:
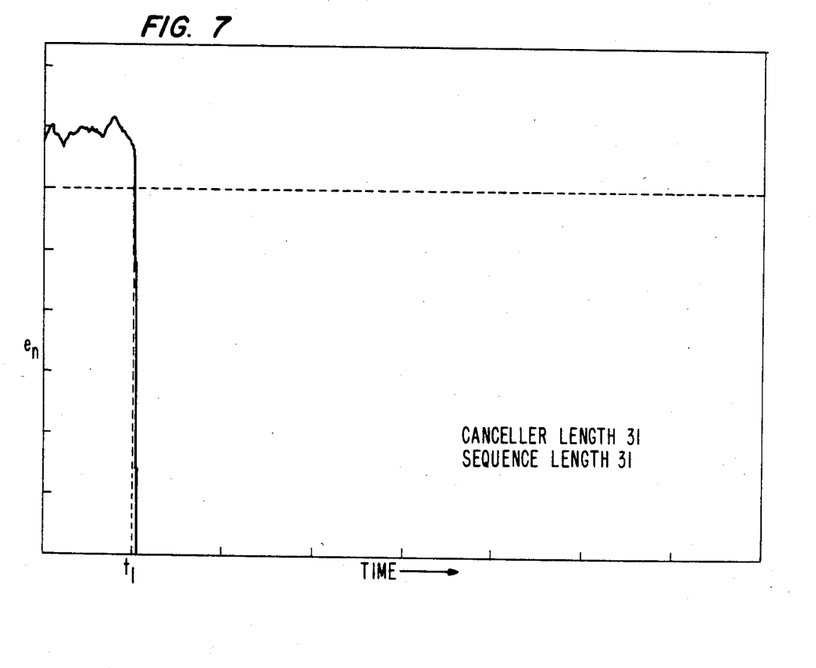
FIG. 7 is a graph similar to FIGS. 3–5 showing the error signal formed when an echo canceler is started up in accordance with the present invention.

The improvement enabled by use of the present invention during start-up can be appreciated by reference to FIG. 7, which illustrates the error output from subtractor 105 as a function of time for an echo canceler with 31 taps. As can be seen in FIG. 7, the error value until time t1 during processing of the initial 31 data elements is relatively high. However, at the end of the interval, there is a significant drop in the error signal, which becomes essentially zero. The canceler apparatus can thus be switched much more quickly to its normal operating mode, as compared to the prior art arrangement illustrated in connection with FIGS. 2–4.

The echo canceler discussed previously is a synchronous canceler, that is, it generates a new output at the same rate at which it receives new inputs. Such a canceler cancels the echo E(t) in FIG. 1 only at these instants of time at which A/D converter 141 samples the incoming signal x(t). That is, if the digital signal on line 106 is passed through a D/A converter and then passed through an interpolating low-pass filter, the echo is only zero at the instants of time at which E(t) was sampled, with some fixed delay accounting for the time required to compute the echo canceler's output. In general, the residual echo will not be zero at other instants of time. This is undesirable in many applications which require cancellation of the echo at *all* instants of time. A canceler which has such a property is sometimes called a Nyquist canceler. Such a canceler requires that the A/D converter sample at a rate which is at least twice the highest frequency component in E(t) on line 103 in FIG. 1. As a result, the echo canceler will have to generate outputs on line 104 at the sampling rate of the A/D converter. This rate will generally be larger than the rate at which circuit 109 receives new inputs. In order to synchronize the input and output rates of the echo canceler, zeroes are generally inserted on line 100, in-between new elements generated by circuits 111 or 125.

Figure 8:
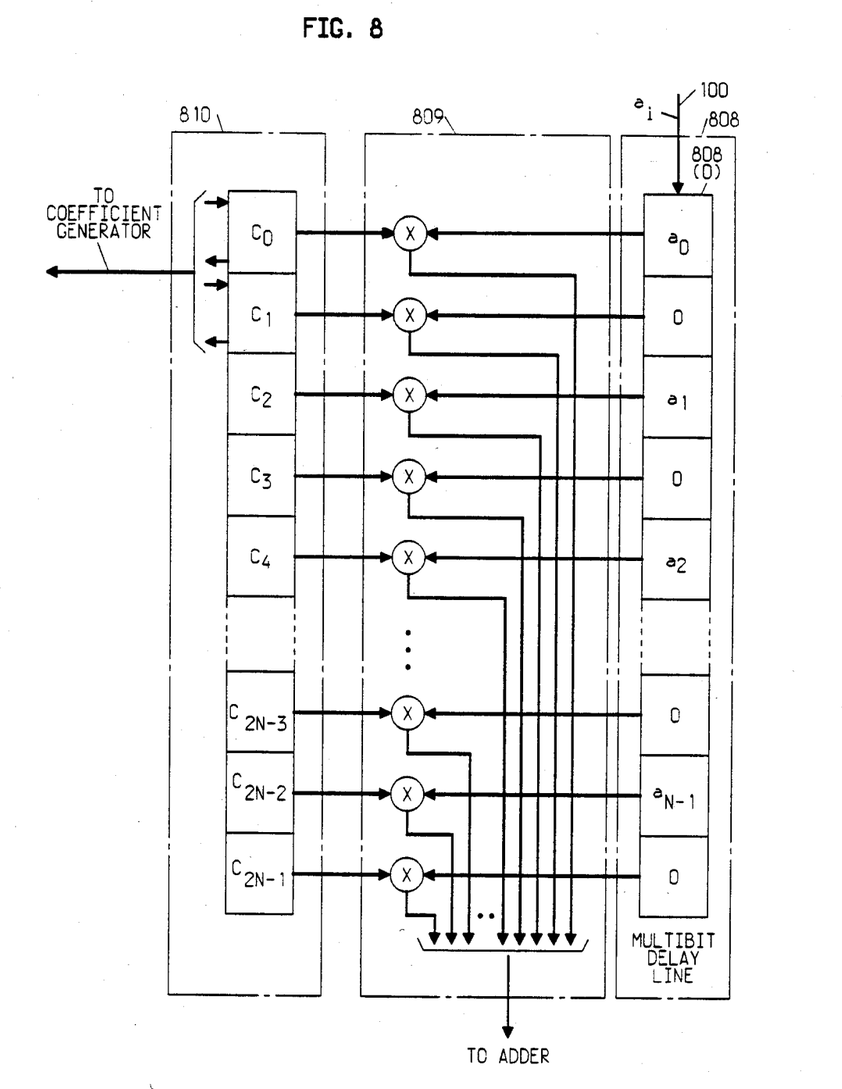
FIG. 8 is a block diagram of a portion of an echo canceler arranged to operate at the Nyquist sampling rate which may use the start-up technique of the present invention.

As an illustration, we consider the case where the canceler generates outputs at a rate which is twice the rate of which circuits 111 or 125 generate new elements $a_i$. FIG. 8 illustrates the relevant modifications to circuit 208, 209 and 210 of FIG. 2. For simplicity the adder 200 in multiplier and combiner circuit 209 is not shown.

Notice first that in FIG. 8, multibit delay line 808 and coefficient store 810 are arranged to store 2N entries, where N is the period of the sequence $\{a_i\}$. Notice also that only half of the tap weights $c_i$ in coefficient store 810 contribute to the canceler's output. The other ones are multiplied by zero. With the configuration of the multibit delay line shown in FIG. 8, the coefficients that contribute to the canceler output are tap weights $c_0, c_2, c_4 \ldots c_{2N-2}$. When the next A/D sample is available, all the entries in the delay line are shifted down by one position and a zero is inserted in the first location 808(0). Only the coefficients $c_1, c_3 \ldots c_{2N-3}, c_{2N-1}$ contribute to the canceler's output. In the next sampling period the entries in the delay line are again shifted down by one position. A new $a_i$ is now available and is inserted in the location 808(0) of the delay line. The first set of coefficients $c_0, \ldots c_{2N-2}$ contributes again to the canceler's output. Multiplications by zero in multiplier circuit 809 need not be performed. This suggests the modification of circuits 808, 809 and 810 shown in FIG. 9. In this arrangement, no zeroes are inserted in the delay line 908. Shiftings of the values $a_i$ in this delay line is done at the rate at which new $a_i$ are generated. Circuit 910 now incorporates a multiple switch which selects alternatively between two sets of coefficients. The switching is done at the sampling rate of the A/D converter, which, in this example, is twice the rate at which new values $a_i$ are generated.

Figure 9:
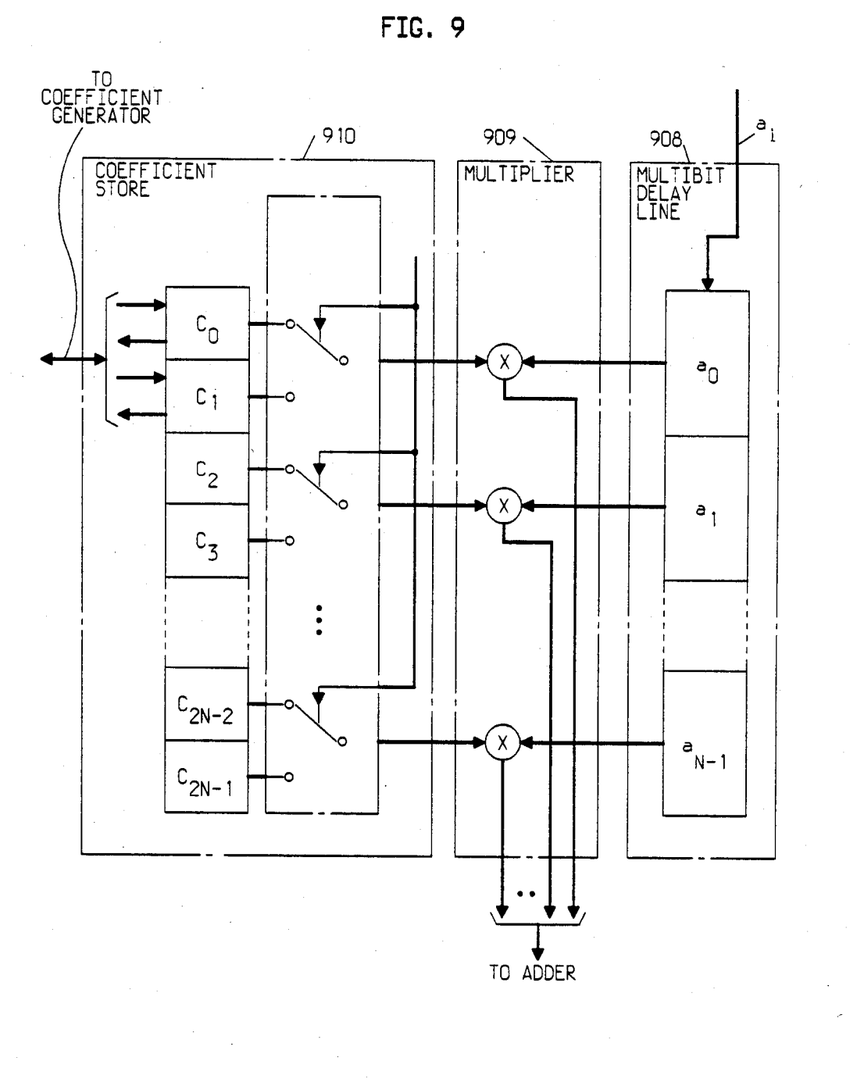
FIG. 9 is a block diagram of an alternative arrangement to that shown in FIG. 8.

Generalization to the case where the A/D converter samples at a rate which is L times larger than the rate at which the $a_i$'s are generated is straightforward. In particular, the number of coefficients now needed is the product of N and L, and switch 911 selects one of L sets of coefficients in a cyclic fashion, at the A/D converter's sampling rate.

The fast start-up procedure described previously for the synchronous canceler of FIGS. 1 and 2 applies to this Nyquist canceler if the following rules are followed:

1. If the sequence $\{a_i\}$ has length N, then the canceler requires N times L coefficients which are divided in L subsets.

2. Each subset of coefficients is used to compute the canceler's output at the rate at which new $a_i$'s are generated.

3. Generation of the canceler's outputs at the A/D's sampling rate is achieved by switching in a cyclic fashion between the L subsets of coefficients.

4. Updating of the coefficient values of a given subset is only performed when this subset is used to compute the canceler's output. The rules defined for the synchronous canceler are then followed.

In summary, the Nyquist canceler can be considered as consisting of L subcancelers are in fact synchronous cancelers contributing to the output in a cyclic fashion. The rules defined for fast start-up previously apply, independently, to each synchronous canceler.

Various adaptations and modifications of the present invention will be readily apparent to those skilled in the art. For this reason, it is intended that the present invention be limited only by the appended claims. For example, while specific start-up sequences have been identified, it is possible that other sequences may be used, provided that the sequences used for application to the transmission channel and for updating of canceler coefficients are "orthogonal" sequences. In addition, various implementations for echo cancelers are known to those skilled in the art, including implementations with microprocessors, and the present invention may nevertheless be practiced in such arrangements provided that the relationship between the start-up sequences is as set forth above.

The present invention can also be used in an echo measurement device having application in the fields of radar, seismology, etc. In this case, the coefficients in the transversal filter, when converged, represent a replica of the echo channel.

What is claimed is:

1. Apparatus for providing start-up of an echo canceler arranged to form replicas of the echo components included in respective received signals, said echo components resulting from application of respective data sequences to a transmission medium, said apparatus including:
    means for storing a plurality of canceler coefficients,
    means for generating as an individual one of said replicas a signal equal to the sum of the products of ones of said stored coefficients and elements of an applied one of said data sequences; and
    means for periodically updating said stored coefficients as a function of (1) the difference between said individual replica and its respective received signal, and (2) elements of a second data sequence which is orthogonal to said applied one sequence.

2. The invention defined in claim 1 wherein N is a predetermined positive integer and said apparatus includes means for generating elements $a_i = \pm 1$ ($0 \leq i \leq N-1$) of said applied one sequence such that $$\sum_{i=0}^{N-1} a_i = 1$$

and such that said elements $a_i$ form a vector $A_i = a_i, a_{i+1}, \ldots a_{n-1}, a_0, a_1 \ldots a_{i-1}$ wherein $$A_i \cdot A_j = N \text{ if } i = j$$

and $$A_i \cdot A_j = -1 \text{ if } i \neq j,$$

where j is an index between 0 and $N-1$.

3. The invention defined in claim 2 wherein said apparatus includes means for converting elements in said applied one sequence to elements $a'_i$ in said second sequence to form a vector $A'_i = a'_i, a'_{i+1}, \ldots a'_{N-1}, a'_0, a'_1 \ldots a'_{i-1}$ such that $$A'_i \cdot A_j = N+1 \text{ if } i = j$$

and $$A'_i \cdot A_j = 0 \text{ if } i \neq j.$$

4. The invention defined in claim 3 wherein said converting means is arranged to generate each element in said second sequence such that $a'_i = a_i + 1$.

5. Apparatus for initializing an echo measurement device, said device being adapted to form replicas of the echo components included in a received signal, said echo components being generated in response to application of an input data sequence to a transmission medium, and said device including means for storing a plurality of canceler coefficients which are a replica of an echo response of said transmission medium, and means for generating as said echo component replicas signals each equal to the sum of the products of ones of said stored coefficients and elements of said input data sequence; said apparatus including
    means for applying to said transmission medium as said input data sequence a first start-up data sequence, and
    means for periodically updating said stored coefficients as a function of the difference between each echo component replica and said received signal, and as a function of a second start-up data sequence orthogonal to said first start-up data sequence.

6. Apparatus for initializing tap weight coefficients in an echo canceler, said apparatus including:
    means for transmitting elements of a first data sequence on a transmission channel,
    means responsive to an echo signal received in response to transmission of said first sequence for forming an error signal representing the difference between said echo signal and an estimate thereof,
    means for forming said estimate as a function of (a) a plurality of stored tap weight coefficients, and (b) elements in said first sequence, and
    means for recursively updating said coefficients as a function of said error signal and elements in a second data sequence which is orthogonal to said first sequence.

7. The invention defined in claim 6 wherein said apparatus further includes:
    means for generating said elements in said second sequence as a function of corresponding elements in said first sequence.

8. The invention defined in claim 7 wherein said first sequence elements are elements $a_i$ having values $\pm 1$ which are formed from a maximum length sequence, of 1's and 0's, said first sequence elements being arranged such that:

$$\sum_{i=0}^{N-1} a_i = 1$$

where N is a predetermined positive integer, and such that said first sequence elements $a_i$ form a vector $A_i = a_i, a_{i+1}, \ldots a_{N-1}, a_0, a_1 \ldots a_{i-1}$ such that $$A_i \cdot A_j = N \text{ if } i = j$$

and $$A_i \cdot A_j = -1 \text{ if } i \neq j,$$

where j is an index between 0 and $N-1$.

9. Apparatus for providing fast start-up in an echo canceler including:
    means for transmitting elements of a first data sequence on a transmission channel,
    means for forming an estimate of an echo signal, generated in response to application of said first sequence to said transmission channel, as a function of (a) a plurality of stored canceler coefficients, and (b) elements in said first data sequence,
    means for forming an error signal representing the difference between said error signal and said estimate thereof, and
    means for recursively updating said coefficients as a function of said error signal and elements in a second data sequence which is orthogonal to said first sequence.

10. A method of providing start-up of an echo canceler arranged to form replicas of the echo components included in respective received signals, said echo components resulting from application of respective data sequences to a transmission medium, said method including the steps of:

storing a plurality of canceler coefficients, generating as an individual one of said replicas a signal equal to the sum of the products of ones of said stored coefficients and elements of an applied one of said data sequences; and periodically updating said stored coefficients as a function of (1) the difference between said individual replica and its respective received signal, and (2) elements of a second data sequence which is orthogonal to said applied one sequence.

11. The method defined in claim 10 wherein N is a predetermined positive integer and said method includes generating elements $a_i = \pm 1$ ($0 \leq i \leq N-1$) of said applied one sequence such that $$\sum_{i=0}^{N-1} a_i = 1$$

and such that said elements $a_i$ form a vector $A_i = a_i, a_{i+1}, \ldots a_{N-1}, a_0, a_1 \ldots a_{i-1}$ wherein $$A_i \cdot A_j = N \text{ if } i = j$$

and $$A_i \cdot A_j = -1 \text{ if } i \neq j,$$

where j is an index between 0 and $N-1$.

12. The method defined in claim 11 wherein said method includes converting elements in said applied one sequence to elements $a'_i$ in said second sequence to form a vector $A'_i = a'_i, a'_{i+1}, \ldots a'_{N-1}, a'_0, a'_1 \ldots a'_{i-1}$ such that $$A'_i \cdot A_j = N+1 \text{ if } i = j$$

and $$A'_i \cdot A_j = 0 \text{ if } i \neq j.$$

13. The method defined in claim 12 wherein said converting step includes generating each element in said second sequence such that $a'_i = a_i + 1$.

14. A method of initializing an echo measurement device, said device being adapted to form replicas of the echo components included in a received signal, said echo components being generated in response to application of an input data sequence to a transmission medium, said device including means for storing a plurality of canceler coefficients which are a replica of an echo response of said transmission medium, and means for generating as said echo component replicas signals each equal to the sum of the products of ones of said stored coefficients and elements of said input data sequence; said method including the steps of applying to said transmission medium as said input data sequence a first start-up data sequence and periodically updating said stored coefficients as a function of the difference between each echo component replica and said received signal, and as a function of a second start-up data sequence orthogonal to said first start-up data sequence.

15. A technique for initializing tap weight coefficients in an echo canceler including a transversal filter, said technique including:

transmitting elements of a first data sequence on a transmission channel, forming an error signal representing the difference between an echo signal received in response to the transmission of said first sequence and an estimate thereof, forming said estimate in said transversal filter as a function of (a) a plurality of stored tap weight coefficients, and (b) elements in said first data sequence, and recursively updating said coefficients as a function of said error signal and elements in a second data sequence which is orthogonal to said first sequence.

16. The technique defined in claim 15 wherein said technique further includes:

generating elements in said second sequence as a function of corresponding elements in said first sequence.

17. The technique defined in claim 16 wherein said first sequence elements are elements $a_i$ having values $\pm 1$ which are formed from a maximum length sequence, having of 1's and 0's, said first sequence elements being arranged such that:

where N is a predetermined positive integer, and said elements $a_i$ form a vector $A_i = a_i, a_{i+1}, \ldots a_{N-1}, a_0, a_1 \ldots a_{i-1}$ such that $$A_i \cdot A_j = N \text{ if } i = j$$

and $$A_i \cdot A_j = -1 \text{ if } i \neq j,$$

where j is an index between 0 and $N-1$.

18. A method of providing fast start-up in an echo canceler including:

transmitting elements of a first data sequence on a transmission channel, forming an estimate of an echo signal generated in response to application of said first sequence to said transmission channel as a function of (a) a plurality of stored canceler coefficients, and (b) elements in said first data sequence, forming an error signal representing the difference between said error signal and said estimate thereof, and recursively updating said coefficients as a function of said error signal and elements in a second data sequence which is orthogonal to said first sequence.

* * * * *